(12) United States Patent
Katoh et al.

(10) Patent No.: US 7,466,861 B2
(45) Date of Patent: Dec. 16, 2008

(54) METHOD FOR OUTPUTTING CHARACTER RECOGNITION RESULTS

(75) Inventors: Shin Katoh, Tokyo (JP); Toshimichi Arima, Fujisawa (JP); Michitoshi Sumikawa, Yamoto (JP)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 10/907,753

(22) Filed: Apr. 14, 2005

(65) Prior Publication Data
US 2005/0232495 A1 Oct. 20, 2005

(30) Foreign Application Priority Data
Apr. 19, 2004 (JP) .............................. 2004-123277

(51) Int. Cl.
*G06K 9/62* (2006.01)
(52) U.S. Cl. .................. 382/225; 382/186; 358/403
(58) Field of Classification Search .................. 382/224
See application file for complete search history.

(56) References Cited

U.S. PATENT DOCUMENTS 5,075,896 A * 12/1991 Wilcox et al. ............... 382/225
5,812,697 A * 9/1998 Sakai et al. ................. 382/186
5,943,443 A * 8/1999 Itonori et al. ............... 382/225
6,219,639 B1 * 4/2001 Bakis et al. ................. 704/246

FOREIGN PATENT DOCUMENTS

JP  PUPA06-096263  4/1994
JP  PUPA11-007492  1/1999

\* cited by examiner

*Primary Examiner*—Samir A. Ahmed
*Assistant Examiner*—Aklilu K Woldemariam
(74) *Attorney, Agent, or Firm*—Marcia L. Doubet; Andre M. Gibbs

(57) ABSTRACT

An output mechanism of a character recognition device includes a category classifier for classifying image data of characters to be recognized for each category recognized in character recognition processing, a clustering processor for determining feature values related to shapes of characters included in the image data in each category classified by the category classifier, and for classifying the image data into one or more clusters based on the feature values, and a screen creator for creating a confirmation screen for displaying the image data for each cluster classified by the clustering processor.

3 Claims, 9 Drawing Sheets

METHOD FOR OUTPUTTING CHARACTER RECOGNITION RESULTS

DESCRIPTION

1. Field of the Invention

The present invention relates to a display control method and particularly to a method for controlling the screen display of images generated during optical character recognition operations.

2. Background Art

When employing OCR (Optical Character Recognition) technology in a computer to recognize printed or handwritten characters, it is difficult to completely eliminate recognition errors. For this reason, it is a common practice to have an operator visually check recognition results to detect and correct errors.

When an operator makes a visual check of recognition results, the operator's efficiency depends largely on the design of a confirmation screen through which the operator compares a character image with its recognized character. In other words, if the confirmation process requires a large number of complicated steps, high work efficiency cannot be expected. Further, where the confirmation user interface is poorly designed, the operator may continually have to move his or her eyes up and down and side to side, which will eventually cause the operator to suffer severe eyestrain.

In order to reduce the number of steps for the confirmation work and relieve the work load of the operator, it is known in the art to use a display screen of the type shown in FIG. 9.

The screen shown in FIG. 9 displays all character images that are classified in the same category (character) as a result of recognition by an OCR system. This confirmation screen takes account of the human visual ability to easily detect, among a large number of characters having the same basic shape, a small number of characters having a different shape or shapes (i.e., misrecognized characters). The known screen design also enables the operator to determine a category as a result of recognition from correctly recognized character images, thus saving time to confirm one category for each character image. Thus, it is possible to perform efficient confirmation and correction works on the recognition results by using this confirmation screen.

This conventional confirmation screen would be very effective if character images recognized as belonging to the same category have substantially the same shape, such as printed characters.

However, if handwritten characters and/or printed characters of different fonts coexist, shapes of character images recognized as belonging to the same category would be considerably different from each other. In this case, it is difficult to make effective use of the human visual ability to easily detect, among a large number of characters having the same shape, a small number of characters having a different shape or shapes.

SUMMARY OF THE INVENTION

It is an object of the present invention to display the results of optical character recognition in such a way that an operator can more efficiently review and correct the recognition results, thereby reducing the work load of the operator.

It is another object of the present invention to enhance the effectiveness of a confirmation screen on which character images recognized as belonging to the same category are collectively displayed, by processing the results of character recognition based on the shape of each character image.

In order to achieve the above-mentioned objects, the present invention is implemented as a character recognition device or an output mechanism or device for its recognition results. Specifically, the output mechanism or device for the character recognition results includes a data storage for storing image data of characters to be recognized in character recognition processing, and a category classifier for classifying the image data stored in the data storage for each category recognized in the character recognition processing. The output mechanism or device further includes a clustering processor for determining feature values related to shapes of characters included in the image data and classifying the image data into one or more clusters based on the feature values for each category classified by the category classifier, and a screen creator for creating a confirmation screen for displaying the image data for each cluster classified by the clustering processor.

More specifically, the clustering processor extracts, for example, peripheral features included in the image data, and classifies the image data into clusters based on the distance between peripheral features in a feature space. More concretely, it determines a feature vector of the peripheral feature from the image data of each character, and divides the feature space of the peripheral features into clusters based on the distance between feature vectors of characters in the feature space. Then, it corrects the arrangement of the feature vectors belonging to each cluster in the divided feature space based on the distance between the feature vectors in each cluster.

More specifically, the screen creator creates a confirmation screen for displaying the image data classified into a plurality of clusters by the clustering processor, on which the image data are collectively displayed for each cluster. Preferably, the screen creator displays the image data on the confirmation screen by varying display colors for each cluster. In one implementation, a background color of a display area or a display color of character image data may be varied. Further, the screen creator may also display information related to the cluster to which the image data belongs in such a manner to attach the information to the corresponding image data.

The output mechanism or device for character recognition results may further include a sorter for sorting, on a cluster basis, the image data classified by the clustering processor. In this case, the screen creator displays the image data on the confirmation screen according to the sorting results from the sorter.

The present invention also achieves the above-mentioned objects by a computer implemented method for outputting the results of character recognition processing. This method includes a first step of classifying image data of characters to be recognized for each category recognized in the character recognition processing, a second step of reading out the image data, determining feature values related to shapes of characters included in the image data and classifying the image data into one or more clusters based on the feature values, for each classified category, and a third step of creating a confirmation screen for displaying the image data for each classified cluster.

This method may further include a step of sorting the image data for each cluster. In this case, the image data may be displayed on the confirmation screen in the third step according to the sorting results.

Further, the present invention is implemented as a program for enabling a computer to execute processes corresponding to the respective steps in the above computer implemented method for outputting character recognition results, or as a program for enabling a computer to execute the functions of the above-mentioned output mechanism or device for character recognition results. This program may be distributed in the form of a magnetic disk, optical disk, a semiconductor memory or any other recording medium, or through a network.

According to the present invention configured as above, it is possible to collectively display character images having similar character shapes on a confirmation screen where the character images belonging to the same category are arranged.

Thus the present invention makes it possible to improve the efficiency of the operator to confirm and correct recognition results.

DETAILED DESCRIPTION

The present may be incorporated into a character recognition device as an output system or mechanism thereof or it may be configured as a character recognition results output device provided separately from a recognition system. In the following, the embodiment will be described as a standalone output device for character recognition results.

Figure 1:
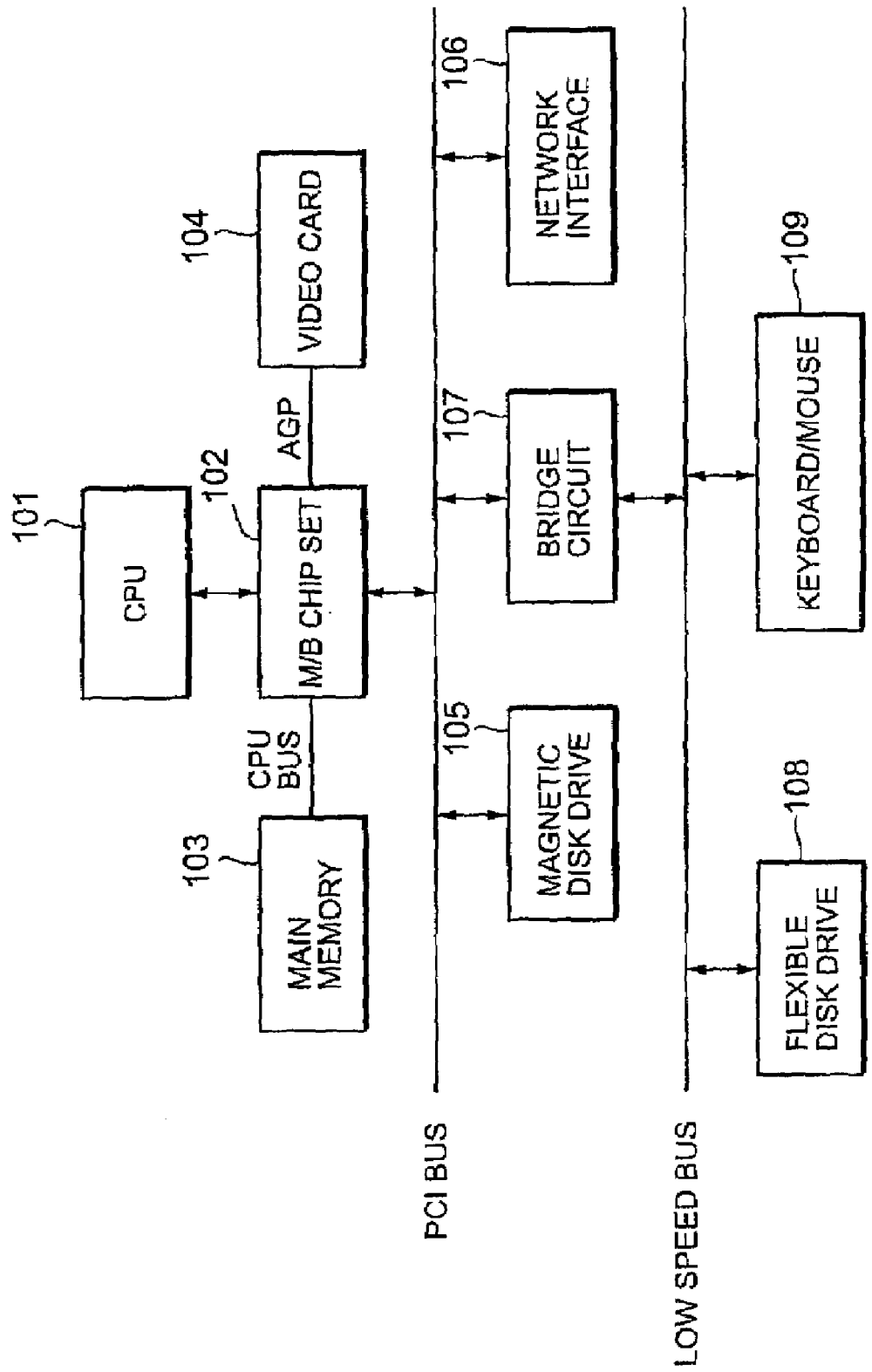
FIG. 1 schematically shows an example of hardware configuration of a computer suitable for implementing an output device for character recognition results according to an embodiment.

FIG. 1 schematically shows an example of hardware configuration of a computer suitable for implementing the output device for character recognition results.

The computer shown in FIG. 1 includes a CPU (Central Processing Unit) 101 as computation means, a main memory 103 connected to the CPU 101 through an M/B (Mother Board) chip set 102 and a CPU bus, and a video card 104 connected to the CPU 101 through the M/B chip set 102 and an AGP (Accelerated Graphics Port). It also includes a magnetic disk drive (HDD) 105 and a network interface 106, both connected to the M/B chip set 102 through a PCI (Peripheral Component Interconnect) bus. It further includes a flexible disk drive 108 and keyboard/mouse 109, both connected to the M/B chip set 102 through the PCI bus via a bridge circuit 107 and a low-speed bus such as an ISA (Industry Standard Architecture) bus.

FIG. 1 just illustrates the hardware configuration of the computer used to implement the embodiment, and any other configuration may be employed as long as the embodiment is applicable thereto. For example, only a video memory may be mounted instead of the video card 104 so that the CPU will process image data. An external storage, such as a CD-R (Compact Disc Recordable) or DVD-RAM (Digital Versatile Disc Random Access Memory) drive, may also be provided through an interface such as an ATA (AT Attachment) or SCSI (Small Computer System Interface).

Figure 2:
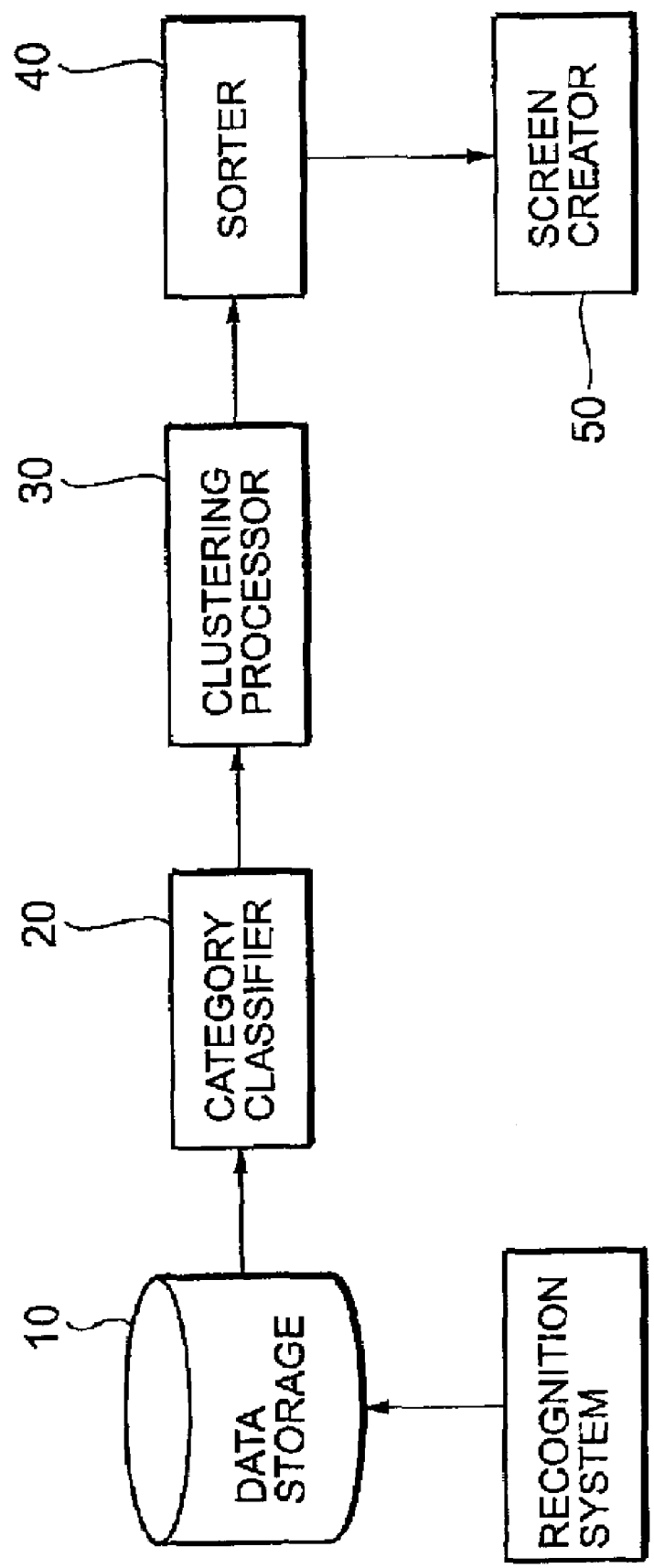
FIG. 2 shows functional configuration of the output device for character recognition results according to the embodiment.

FIG. 2 shows functional configuration of the output device for character recognition results according to the embodiment. Referring to FIG. 2, the output device for character recognition results according to the embodiment includes a data storage 10 for storing image data recognized by an OCR recognition system and their recognition results, a category classifier 20 for classifying the recognition results for each category (individual character), a clustering processor 30 for further clustering the recognition results in each category, a sorter 40 for sorting the results of the clustering processing, and a screen creator 50 for creating a screen for outputting the recognition results by merging the sort results.

The data storage 10 may be implemented by a storage device such as the magnetic disk drive 105 shown in FIG. 1 to store and retain image data of characters recognized by the OCR recognition system. When the image data of the recognition results are inputted from the recognition system, they are organized based on original information at the time of recognition. For example, when characters written on a paper form are read by the OCR, image data of recognition results are filed for each form and stored in the data storage 10.

The category classifier 20 may be implemented by the program controlled CPU 101 shown in FIG. 1 to classify the image data stored in the data storage 10 for each recognized category (character). The image data classified for each category are stored again in the data storage 10.

The clustering processor 30 may be implemented by the program controlled CPU 101 shown in FIG. 1 to select image data in one category from those classified by the category classifier 20, read them from the data storage 10, and perform clustering processing to further classify character images in the same category into clusters.

The clustering processing automatically classifies character images into the same kinds or shapes using a statistical technique. However, even when character images are recognized as belonging to the same category (character) by the category classifier 20, they may be classified into a plurality of clusters in the case of handwritten characters because their image shapes may be considerably different from each other. Any feature value may be used for classification in the clustering processing as long as it affects judgment, such as a logical judgment on outward appearance by a human operator who checks the recognition results. For example, the same feature values as those used for character recognition by the recognition system may be used. Also, any other feature values may be selectively used as long as they enable clear visual discrimination.

The image data classified into clusters by the clustering processor 30 are retained in storage means, such as the main memory 103 or a cache memory of the CPU 101, and used in the processing by the sorter 40.

The sorter 40 may be implemented by the program controlled CPU 101 shown in FIG. 1 to sort character images classified in detail by the clustering processor 30 for each cluster. Various criteria may be used as sorting criteria. Like in the clustering processing, sorting may be performed based on feature values that affect the judgment by the operator who checks the recognition results.

The sort results from the sorter 40 are retained in storage means, such as the main memory 103 or the cache memory of the CPU 101 shown in FIG. 1, and used by the screen creator 50.

The screen creator 50 may be implemented by the program controlled CPU 101 shown in FIG. 1 and a graphics mechanism such as the video card 104 of FIG. 1 to create and display on the monitor a confirmation screen for collectively displaying character images classified into the same category according to the sort results from the sorter 40.

Next, the operations of the clustering processor 30 and the sorter 40 will be described in further detail. As mentioned above, various feature values may be used as criteria in the clustering processing and sorting. In the embodiment described below, however, the clustering processing is performed using peripheral features representing peripheral properties of each character image, and the sorting is performed using a percentage of the number of black pixels as a feature value that affects a gray level of the character image. The clustering processing using the peripheral features will first be described.

Peripheral feature extraction is performed on image data of a character image whose character size has been normalized (hereinafter referred to as normalized image). Since the normalization of the character size of each character image is commonly performed as part of preprocessing for extracting feature vectors from character images to be recognized, the normalized images obtained in the preprocessing may be used with no change.

The peripheral feature involves a feature value that is obtained by measuring a depth or distance from the edge of a character frame to a first black pixel in the normalized image and using its value as an index. This feature can be used for clustering, because human visual perception of a character depends largely on its shape rather than its inward details.

A specific technique for extracting a peripheral feature from a normalized image will be described below.

Figure 3:
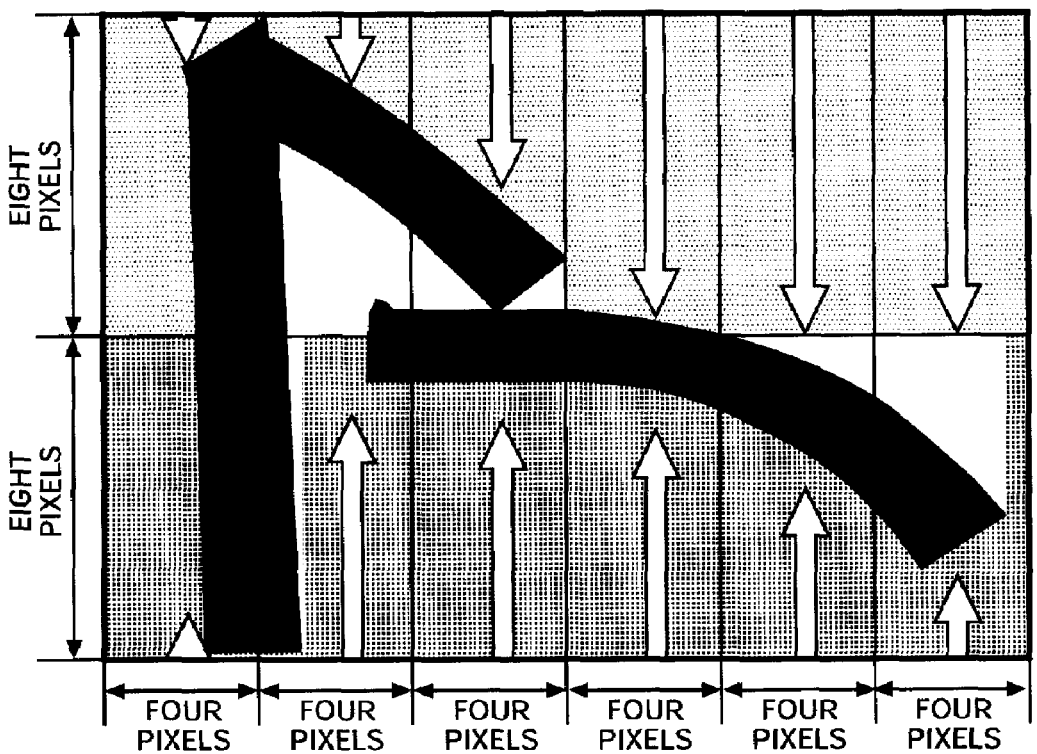
FIG. 3 is an illustration for explaining a method for extracting peripheral features according to the embodiment.
Figure 3:
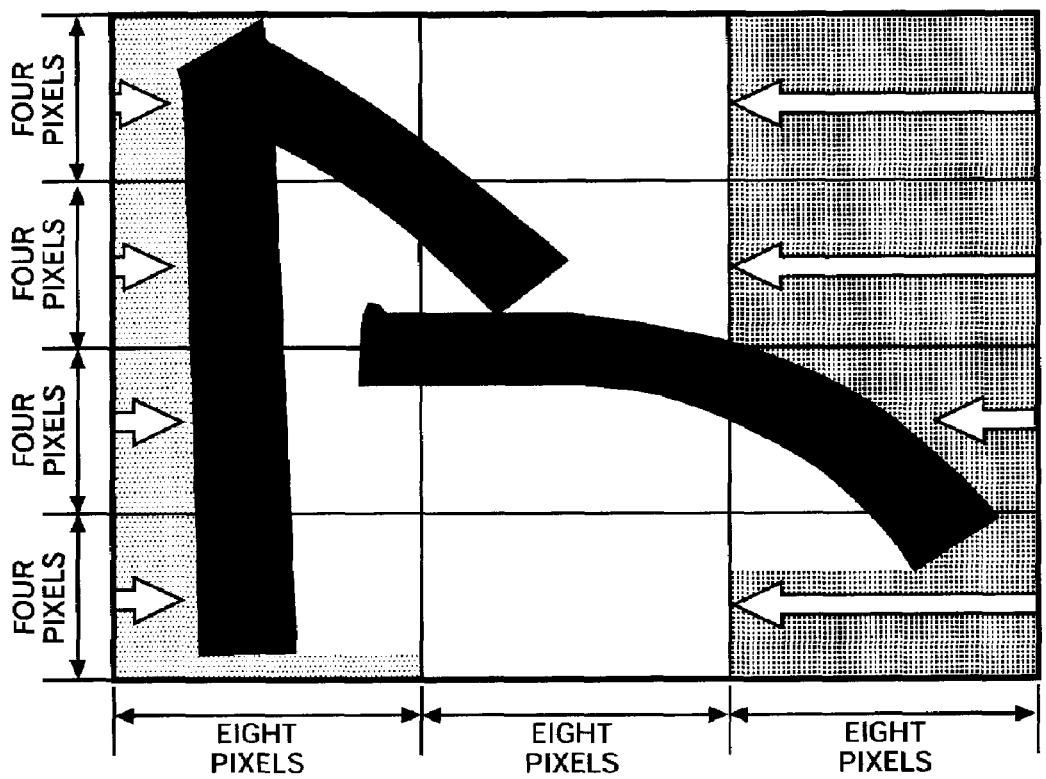

FIG. 3 is an illustration for explaining a peripheral feature extraction method.

It is assumed here that the image of each character is normalized to a size of 16 pixels wide and 24 pixels high. The normalized image is divided into four four-pixel parts in a vertical direction (left image in FIG. 3) and six four-pixel parts in a horizontal direction (right image in FIG. 3) to create smaller rectangular regions. Then, the pixels are scanned in each region from the outer edge toward the inside to determine a depth (length) from the outer edge of the region to a first encountered black pixel. Depth values of all lines of pixels in the region are summed to obtain a feature value of the peripheral feature of the region in the normalized image.

In the case of handwritten characters, the same character may vary in its outward shape from writer to writer. To reduce the influence of such variations, the number of pixels to be scanned in the depth direction may be limited. Assuming that the maximum number of pixels to be scanned per line is eight, a feature value ranges from 0 to 32 because each region has four-pixel width.

Further, as shown in FIG. 3, since the division into four in the horizontal direction and the division into six in the vertical direction create 20 regions, the number of dimensions of the feature values is 20. (In view of the number of dimensions, the peripheral feature values in each character image will be collectively expressed as a feature vector below.)

The clustering processor 30 uses the above-mentioned technique to determine a feature vector of the peripheral feature of each character image in the same category read out of the data storage 10. Then, clustering is performed in such a manner that a set of patterns of character images is divided into subsets, each of which contains as its elements a plurality of patterns similar to one another, according to the following procedure.

Figure 4:
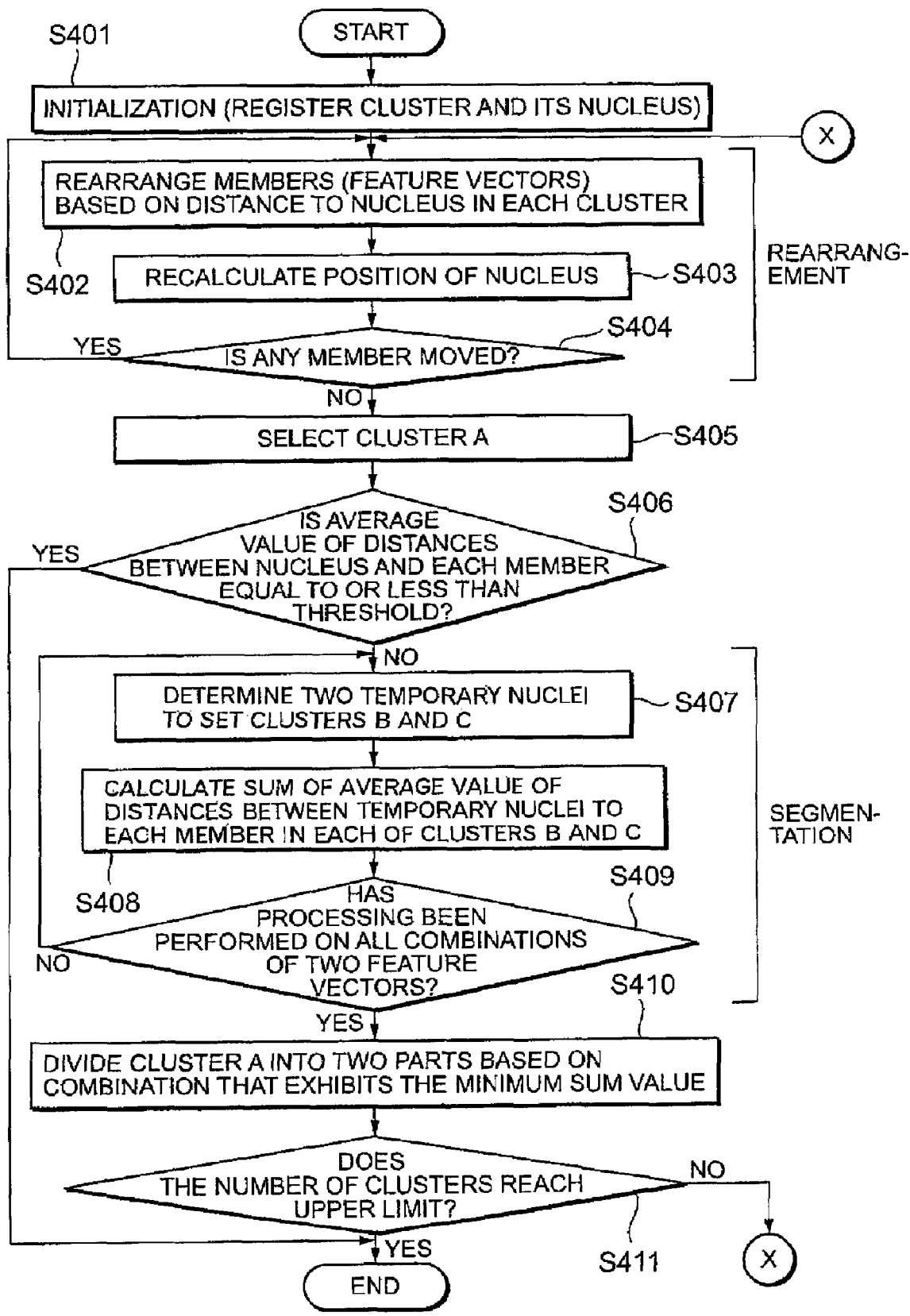
FIG. 4 is a flowchart for explaining a flow of clustering processing according to the embodiment.

FIG. 4 is a flowchart for explaining an exemplary flow of clustering processing by the clustering processor 30.

Referring to FIG. 4, the clustering processor 30 bundles feature vectors of all character images in the same category into a cluster in its initializing operation, and registers the average value of the feature vectors as a nucleus (step 401).

Next, the clustering processor 30 rearranges the members (feature vectors) according to the clustering. At the time of initialization, however, since there exists only one cluster initialized at step 401, the following sequence of operations (steps 402 to 404) for rearranging the members is omitted.

First, the clustering processor 30 calculates, for each of the members, a distance to the nucleus of each registered cluster, and rearranges the members so that each member will belong to a cluster having the nearest nucleus (step 402). The clustering processor 30 then recalculates the position of the nucleus of each cluster in consideration of the rearranged members (step 403). The clustering processor 30 repeats the rearrangement of the members in the clusters and recalculation of the nucleus positions of the clusters until the members are no longer moved (step 404).

If no member has been moved after the repetition of steps 402 and 403, the clustering processor 30 then selects a cluster having the largest average value of distances between the nucleus and each member from among the registered clusters, and designates it as cluster A (step 405). If the average value of the distances between the nucleus and each member in the cluster A is equal to or less than a predetermined threshold, the clustering processing is ended (step 406).

On the other hand, if the average value of the distances between the nucleus and each member in the cluster A exceeds the threshold, the clustering processor 30 further divides the cluster A according to the following procedure.

First, the clustering processor 30 arbitrarily selects two of the feature vectors belonging to the cluster A, and sets them as temporary nuclei. The remaining feature vectors are made to belong to the nearest one of the temporary nuclei to set two clusters B and C (step 407).

Next, the clustering processor 30 determines the average value of distances between the temporary nucleus and the members or remaining feature vectors in each of the clusters B and C, and sums the average values (step 408).

The clustering processor 30 performs the processing steps 407 and 408 on all combinations of two temporary nuclei selected from the feature vectors which are the members of the cluster A (step 409) to calculate the sum of the average values of distances between the temporary nuclei and the remaining feature vectors in each of the clusters B and C based on the respective temporary nuclei. After that, the clustering processor 30 determines a combination of clusters B and C that exhibits the minimum sum of the average values of distances between the temporary nucleus and the remaining feature vectors, and divides the cluster A into two clusters by determining two temporary nuclei in the determined combination as new nuclei of the two clusters (step 410).

If the total number of clusters reaches a predetermined upper limit as a result of dividing the cluster A at step 410, the clustering processor 30 ends the clustering processing (step 411). On the other hand, if the total number of clusters does not reach the predetermined upper limit, the clustering processor 30 returns to step 402 to repeat the rearrangement of the members in the clusters and division of the cluster A.

Figure 5:
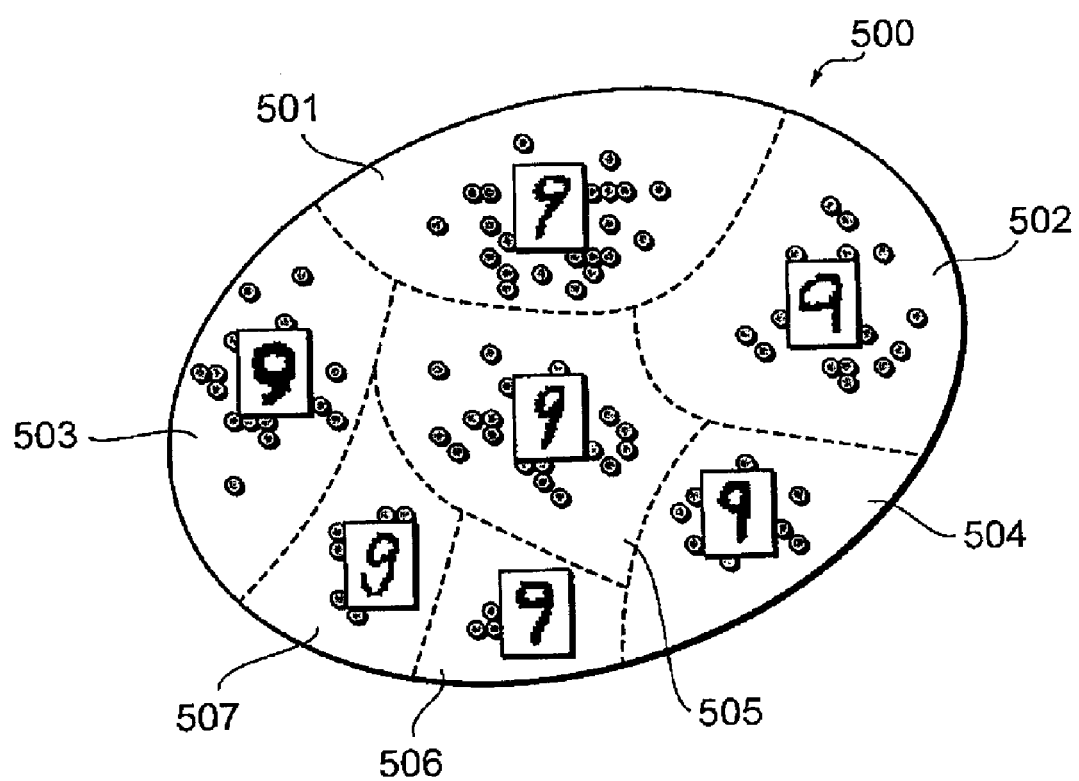
FIG. 5 is an illustration for explaining the results of the clustering processing for character images belonging to a predetermined category according to the embodiment.

FIG. 5 is an illustration for explaining the results of the above-mentioned clustering processing for character images in a predetermined category.

In FIG. 5, a feature space 500 that is a set of multidimensional feature vectors corresponds to the whole category of character images to be processed, and is divided into a plurality of clusters 501 to 507 as a result of the clustering processing. Small circles in each of the clusters 501 to 507 represent individual feature vectors as members of that cluster. This structure of the multidimensional feature space 500 represents the classification results of the clustering processing for character images corresponding to the respective feature vectors.

Next, sorting using the percentage of the number of black pixels in a normalized character frame will be described.

It is known that the human eye is sensitive to light and darkness in an image. Therefore, in the embodiment, the sorter 40 counts the total number of black pixels in a normalized image (character image having a normalized character size) and calculates the percentage of the number of black pixels in the character frame. Then, for each of the clusters obtained by the clustering processor 30, image data are sorted in order from the highest calculated percentage of black pixels. While, in this embodiment, the percentage of black pixels is used as a feature value because characters are often written in black, it is needless to say that the percentage of pixels of any color in which characters are written may be used as a feature value.

Next, the confirmation screen on which the clustering processing by the clustering processor 30 and the sorting by the sorter 40 are reflected will be described in detail.

As mentioned above, the screen creator 50 merges the sort results from the sorter 40 to create a confirmation screen for collectively displaying the character images to be processed.

Figure 6:
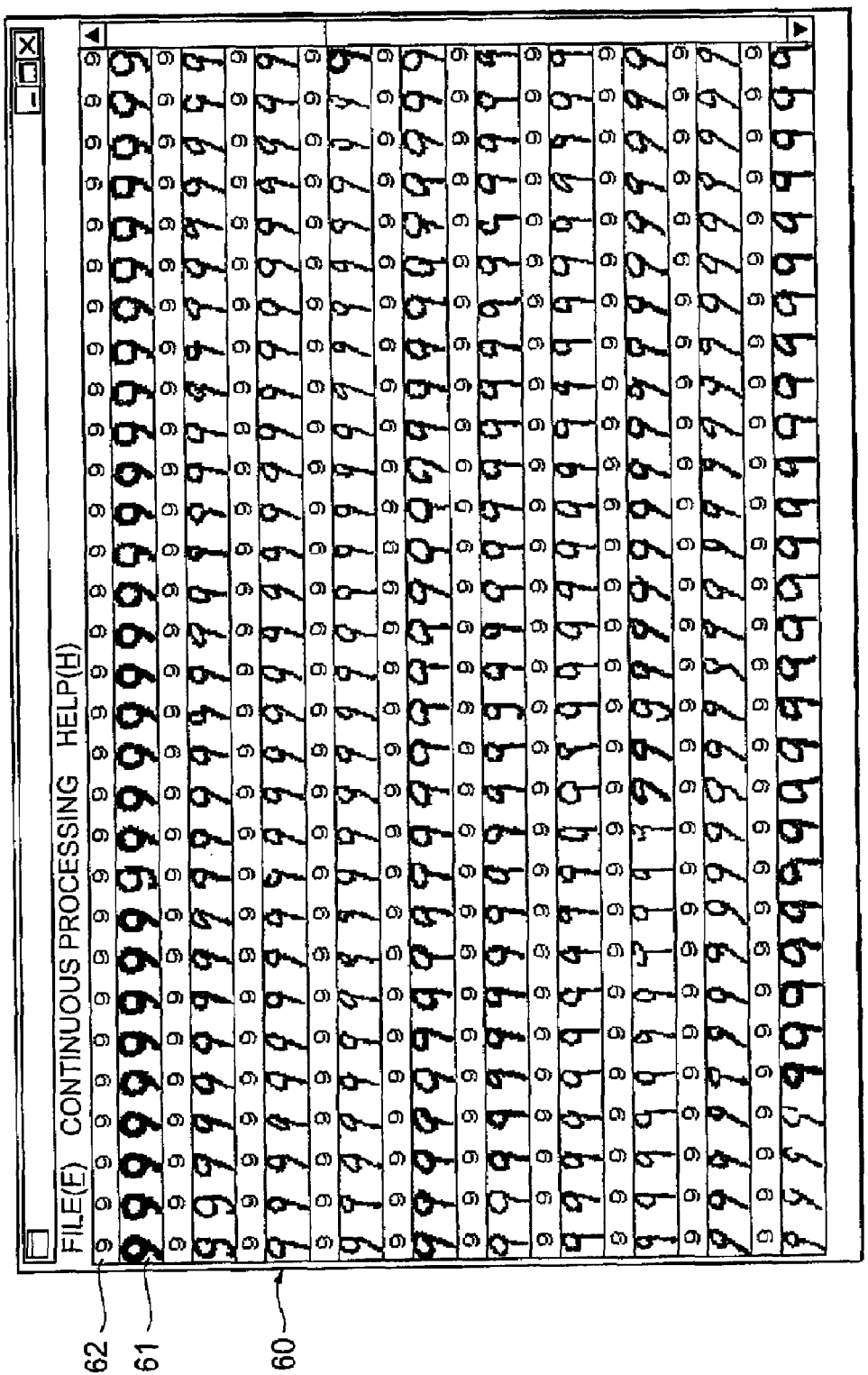
FIG. 6 shows an exemplary confirmation screen created by a screen creator according to the embodiment.

FIG. 6 shows an exemplary confirmation screen created by the screen creator 50.

On the confirmation screen shown in FIG. 6, long and narrow image display fields 61, along which character images sorted by the sorter 40 are arranged, and information display fields 62 for displaying a category of each character image as a result of recognition are arranged in parallel.

Figure 9:
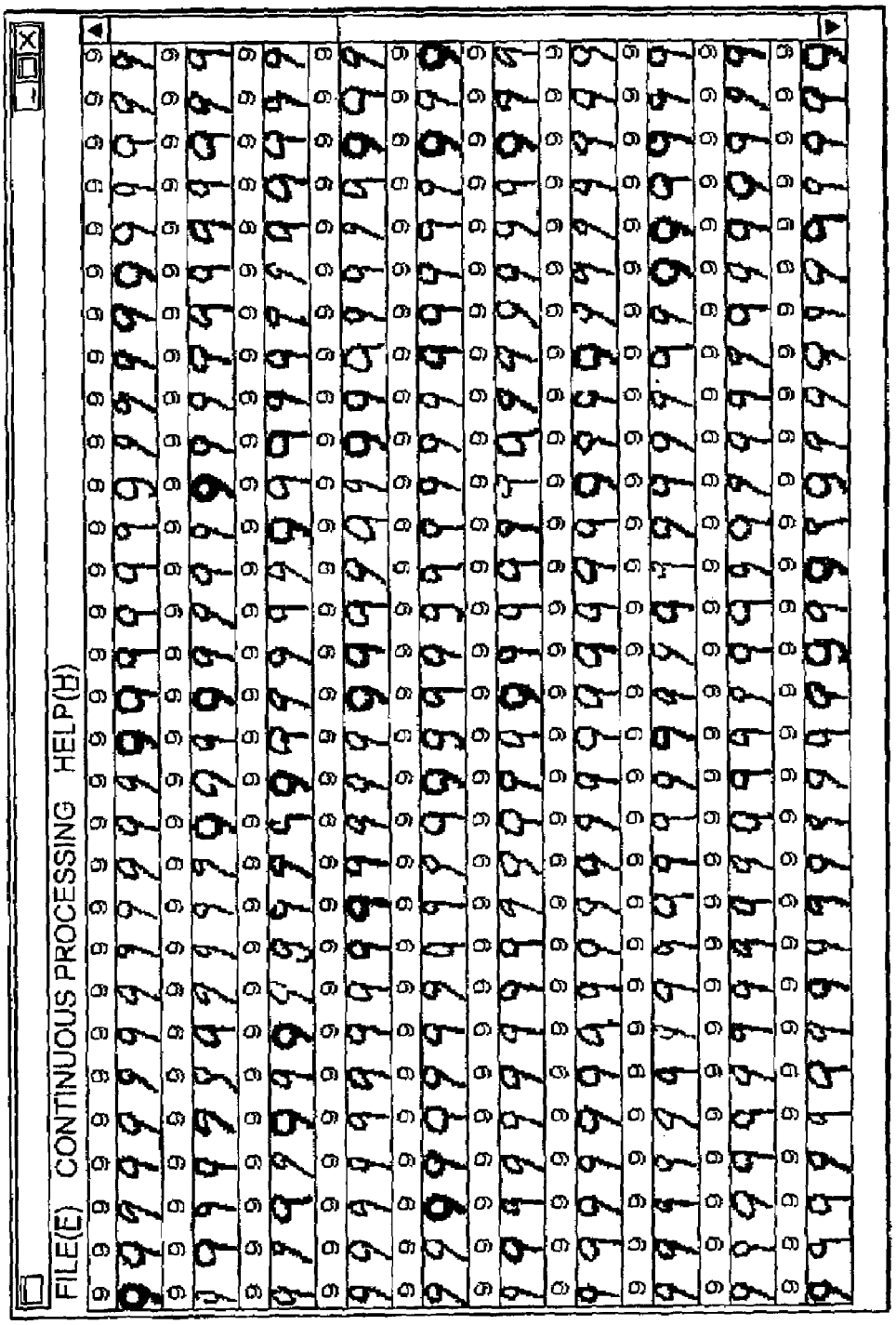
FIG. 9 shows an example of a conventional confirmation screen used for confirmation and correction of recognition results.

Comparing the confirmation screen of FIG. 6 according to the embodiment with the conventional confirmation screen of FIG. 9, it can be seen that, on the former screen, character images similar in thickness and/or shape to one another and giving the human eye the impression that they are alike are selected from all the character images classified in the same category (number "9" in the illustrated example), and collectively displayed.

Use of the confirmation screen as shown in FIG. 6 makes it easier for the operator to do confirmation and correction works on the recognition results with less burden than use of the conventional confirmation screen on which character images of different character shapes are arranged randomly.

Thus, in the embodiment, character images having similar outward shapes characterized by the character thickness and/or shape are classified in the same cluster and collectively displayed. Since a character image misrecognized by the recognition system may not be classified into a certain cluster containing many character images having similar shapes, such misrecognized character images tend to be collectively displayed, so that the confirmation and correction works for the recognition results can be conducted more easily.

Further, the screen creator 50 can control the display to explicitly reflect the results of the clustering processing by the clustering processor 30 on the confirmation screen. For example, the background color of the image display fields 61 displaying the character images and/or the display color of the character images may be changed on a cluster basis, or identification information for each cluster of character images may be displayed in the information display fields 62 instead of displaying the category of the character images.

Figure 7:
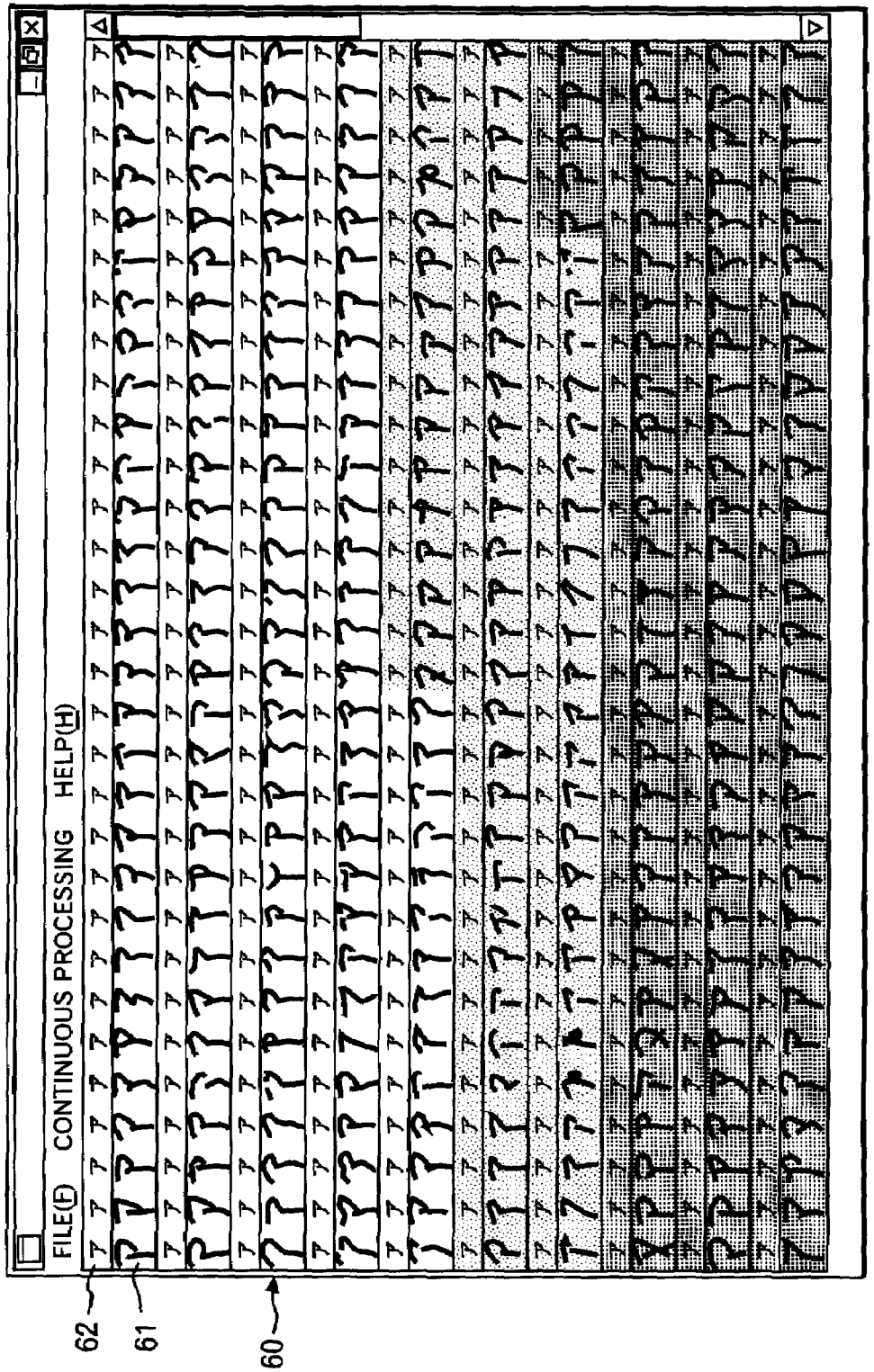
FIG. 7 shows an exemplary display where a background color of image display fields and information display fields on the confirmation screen according to the embodiment is varied for each cluster.
Figure 8:
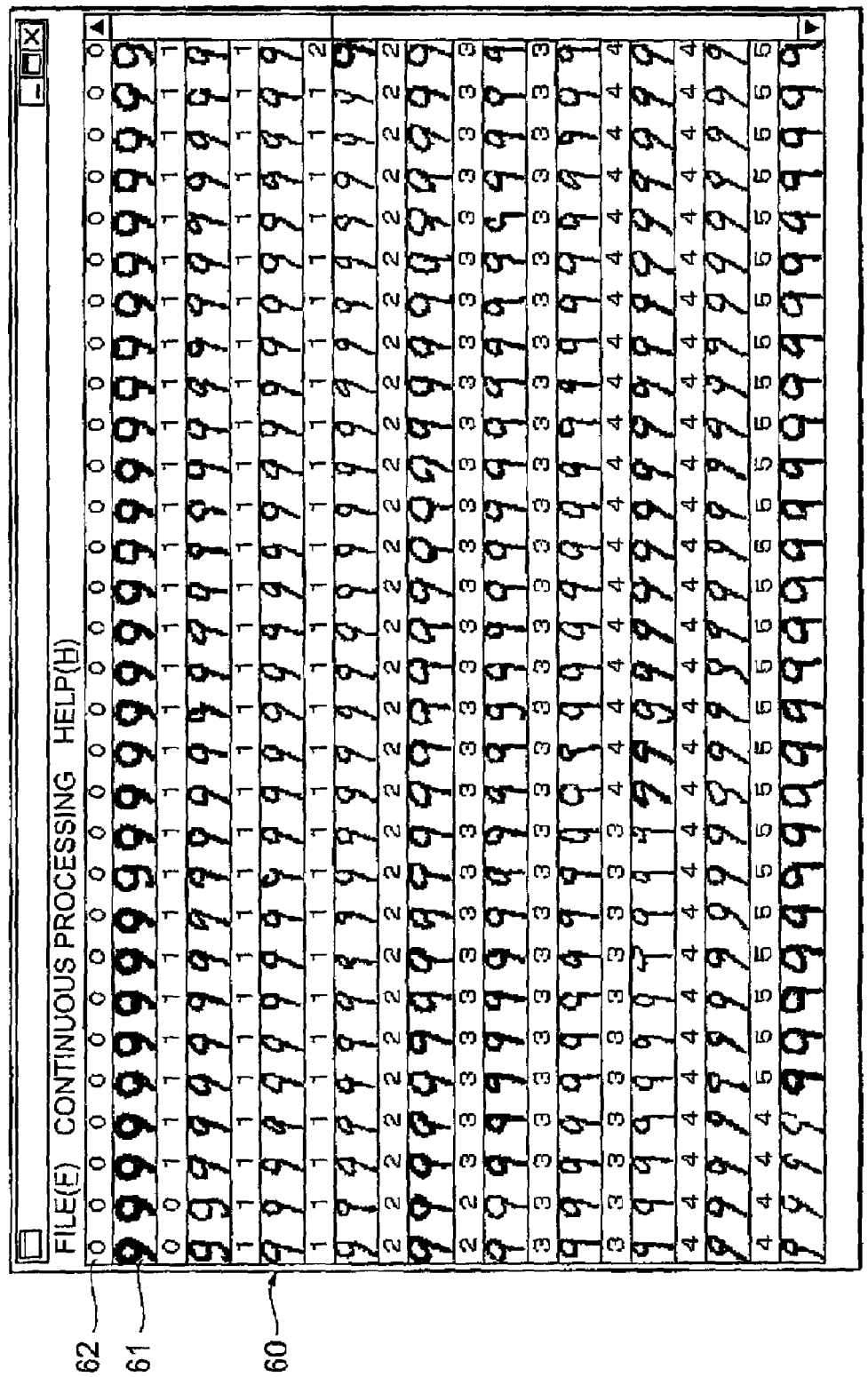
FIG. 8 shows an exemplary display where cluster numbers of corresponding character images are displayed in the information display fields on the confirmation screen according to the embodiment.

FIG. 7 shows an exemplary display where the background color of the image display fields 61 and the information display fields 62 on the confirmation screen 60 is changed on a cluster basis. FIG. 8 shows an exemplary display where cluster numbers (0 to 5 in the illustrated example) of character images are displayed in the information display fields 62 on the confirmation screen 60.

Thus, by explicitly distinguishing the clusters of character images on the confirmation screen 60, the operator can easily grasp a set of character images belonging to the same cluster, so that the confirmation and correction works for the recognition results can be conducted more easily.

What is claimed is:

1. A computer-implemented method for outputting results of character recognition processing, comprising:

performing character recognition processing to classify image data of a plurality of characters to be recognized, thereby associating each of the characters with one of a plurality of categories recognized in the character recognition processing, and storing the image data of the characters associated with each one of the plurality of categories in storage means;

reading out the stored image data, for the characters associated with each one of the plurality of categories, and further classifying each of the characters into one of a plurality of clusters within the category, further comprising:

determining feature values related to shapes of each of the characters read out from stored the image data, further comprising, for each of the characters:

normalizing a size of the image data of the character;

dividing the normalized image data into a particular number of regions oriented in a vertical direction and again into the particular number of regions in a horizontal direction;

determining, for each of a first plurality of pixel lines extending across a width of each of the regions oriented in the vertical direction, a count of a number of pixels encountered when starting from an upper edge of that pixel line in the region, until a color of the normalized image data changes from white to black;

determining, for each of a second plurality of pixel lines extending across a depth of each of the regions oriented in the horizontal direction, the count of the number of pixels encountered when starting from a leftmost edge of that pixel line in the region, until the color of the normalized image data changes from white to black;

summing, for each of the regions, the count of the number of encountered pixels to obtain a feature value for the region; and storing each of the feature values in a feature vector associated with the character;

computing a nucleus for a first cluster within the category as an average value of the feature values in the feature vectors associated with the characters associated with the category, wherein the first cluster initially represents all of the characters associated with the category; and subdividing the first cluster into a plurality of clusters, until reaching a configured maximum number of clusters, by:

selecting a pair comprising two arbitrary ones of the feature vectors associated with the characters associated with the category;

establishing the two arbitrary ones as temporary nuclei for subdividing the first cluster;

assigning each of the other feature vectors associated with the characters associated with the category to a nearest one of the temporary nuclei, thereby creating a pair of temporary clusters;

for each of the temporary clusters, determining an average value of distances between the temporary nucleus for that temporary cluster and each of the assigned feature vectors in that temporary cluster and summing the determined average values;

repeating, for each remaining combination of two of the feature vectors, the selecting, the establishing, the assigning, the determining an average value, and the summing the determined average values; and determining, from the pairs of temporary clusters, which pair exhibits a minimum value for the determined sum and establishing that pair as a new subdivision of the first cluster; and displaying the image data for each of the characters on a confirmation screen, further comprising:

sorting, within each of the categories and each of the clusters into which the category is subdivided, the image data for each of the characters associated with that category and that cluster into a sorted order determined using the feature vector for that character;

displaying, for each of the categories and each of the clusters into which the category is subdivided, the image data for the characters associated with that category and cluster on the confirmation screen in the sorted order, such that the displayed image data is visually grouped by cluster within category; and displaying, for each of the clusters, a cluster identifier in association with the image data displayed for each of the characters associated with that cluster, thereby visually emphasizing when one of the clusters ends and another of the clusters begins.

2. The computer-implemented method according to claim 1 wherein the displaying, for each of the categories and each of the clusters into which the category is subdivided, the image data further comprises using a different color to display the image data for each distinct one of the clusters.

3. The computer-implemented method according to claim 1 wherein the sorting sorts the image data based on a percentage of pixels of a particular color.

* * * * *